United States Patent
Chen et al.

(10) Patent No.: US 6,901,533 B2
(45) Date of Patent: May 31, 2005

(54) RECONSTRUCTING MEMORY RESIDENTS QUEUES OF AN INACTIVE PROCESSOR

(75) Inventors: Shawfu Chen, New Milford, CT (US); Robert O. Dryfoos, Hopewell Junction, NY (US); Allan Feldman, Poughkeepsie, NY (US); David Y. Hu, Poughkeepsie, NY (US); Jason A. Keenaghan, Wappingers Falls, NY (US); Peter A. Lewis, Jacksonville, FL (US); Peter G. Sutton, Lagrangeville, NY (US); Mei-Hui Wang, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 09/938,029

(22) Filed: Aug. 23, 2001

(65) Prior Publication Data

US 2003/0041285 A1 Feb. 27, 2003

(51) Int. Cl.[7] .................................................. G06F 11/20
(52) U.S. Cl. .......................... 714/16; 714/10; 714/13; 714/15
(58) Field of Search ........................... 714/10, 13, 15, 714/16, 20; 707/202, 204

(56) References Cited

U.S. PATENT DOCUMENTS

| 5,133,053 | A | | 7/1992 | Johnson et al. ............. 395/200 |
|---|---|---|---|---|
| 5,222,217 | A | * | 6/1993 | Blount et al. ............... 707/204 |
| 5,459,864 | A | * | 10/1995 | Brent et al. ................ 718/105 |
| 5,465,328 | A | | 11/1995 | Dievendorff et al. .. 395/182.13 |
| 5,621,884 | A | * | 4/1997 | Beshears et al. ............. 714/10 |
| 5,680,539 | A | | 10/1997 | Jones .................... 395/182.04 |
| 5,907,673 | A | | 5/1999 | Hirayama et al. ..... 395/182.14 |
| 6,078,944 | A | | 6/2000 | Enko et al. ................. 709/105 |
| 6,253,212 | B1 | * | 6/2001 | Loaiza et al. ................ 714/19 |
| 6,353,834 | B1 | * | 3/2002 | Wong et al. .................. 714/16 |

FOREIGN PATENT DOCUMENTS

| EP | 280773 A2 | * | 9/1988 | ........... G06F/11/14 |
|---|---|---|---|---|
| JP | 11328003 | | 11/1999 | ........... G06F/12/00 |

* cited by examiner

*Primary Examiner*—Bryce P. Bonzo
*Assistant Examiner*—Joseph D Manoskey
(74) *Attorney, Agent, or Firm*—Andrew J. Wojnicki, Jr., Esq.; Lily Neff, Esq.; Heslin Rothenberg Farley & Mesiti P.C.

(57) ABSTRACT

When a processor becomes inactive, queues resident in the memory of that processor become inaccessible. Thus, in order to access those queues, an active processor takes over ownership of one or more of the inaccessible queues. Each queue may be rebuilt prior to its take over to ensure that it has up-to-date information.

65 Claims, 10 Drawing Sheets

RECONSTRUCTING MEMORY RESIDENTS QUEUES OF AN INACTIVE PROCESSOR

CROSS-REFERENCE TO RELATED APPLICATIONS

This application contains subject matter which is related to the subject matter of the following applications, which are assigned to the same assignee as this application. The below listed applications are hereby incorporated herein by reference in their entirety:

"HIGH-PERFORMANCE MEMORY QUEUE", Chen et al., Ser. No. 09/790,853, filed Feb. 22, 2001;

"PERFORMANCE OF CHANNELS USED IN COMMUNICATING BETWEEN SENDERS AND RECEIVERS", Chen et al., Ser. No. 09/790,781, filed on Feb. 22, 2001; and "MANAGING MEMORY RESIDENT QUEUES TO CONTROL RESOURCES OF THE SYSTEMS USING THE QUEUES", Chen et al., Ser. No. 09/938,031, filed Aug. 23, 2001.

TECHNICAL FIELD

This invention relates, in general, to network messaging and queuing, and in particular, to taking over and/or reconstructing memory resident queues of an inactive processor.

BACKGROUND OF THE INVENTION

One technology that supports messaging and queuing across a network is referred to as MQSeries and is offered by International Business Machines Corporation, Armonk, N.Y. With MQSeries, users can dramatically reduce application development time by using MQSeries API functions. Since MQSeries supports many platforms, MQSeries applications can be ported easily from one platform to another. In a network, two MQSeries systems communicate with each other via channels, such as MQSeries channels. An MQSeries sender channel defines a connection from one MQSeries system to another MQSeries system and transmits messages from the one system to the other system.

To facilitate transmission of messages from one system to another system, memory resident queues are used. In particular, messages are written to and retrieved from the queues. Messages put to a queue are guaranteed to be delivered to their final destination. That is, messages have persistence. It is also guaranteed that only a single copy of the message will be delivered. Also, messages are delivered in a time-independent, asynchronous manner. This is beneficial, since applications may continue processing regardless of the status of the underlying network.

In order to maintain persistence for MQSeries messages, the most common implementation for MQSeries hosts is to have each queue reside on direct access storage device (DASD) media. These queues are referred to as DASD resident queues. DASD resident queues provide a benefit of being easily movable between processors in a parallel complex. This is because they contain the complete up-to-date version of the queues to be moved with no intermediate steps necessary. However, DASD resident queues have proven inadequate in terms of performance. Thus, high performance, high access queues now reside in memory, and are referred to as memory resident queues.

Although memory resident queues have obvious performance improvements over DASD resident queues, difficulties arise when a processor housing a memory resident queue becomes inactive. In this situation, the memory resident queue becomes inaccessible to other processors that may need the queue, until the inactive processor is brought back online. Thus, any messages stored on those queues cannot be delivered to their final destination in a timely manner.

Based on the foregoing, a need exists for a capability that enables an active processor to take over a queue for an inactive processor. A further need exists for a capability that enables an active processor to reconstruct a memory resident queue for an inactive processor.

SUMMARY OF THE INVENTION

The shortcomings of the prior art are overcome and additional advantages are provided through the provision of a method of switching queue ownership. The method includes, for instance, obtaining an indication that a queue is to be taken over, the queue being resident in memory of a first processor; and moving the queue from the first processor to a second processor, the queue to be resident in memory of the second processor.

In a further embodiment, a method of reconstructing queues is provided. The method includes, for instance, rebuilding contents of a queue to obtain an updated version of the queue, the queue being a memory resident queue of a first processor; and reading at least a portion of the updated version of the queue into memory of a second processor, the second processor being different than the first processor.

System and computer program products corresponding to the above-summarized methods are also described and claimed herein.

Advantageously, a capability is provided that enables an active processor to rebuild and take over one or more memory resident queues of an inactive processor. The ability to move ownership of a queue (or messages on the queue) from an inactive processor to an active processor enables those messages to be processed by an application or sent on to the next destination without waiting for the inactive processor to be brought back into the complex.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided which enables one processor (e.g., an active processor) of a communications environment to take over one or more queues of another processor (e.g., an inactive processor) of the environment. In a further aspect of the invention, at least one processor of the environment reconstructs one or more memory resident queues of another processor of the environment.

As one example, a communications environment incorporating and using one or more aspects of the present invention is a scalable parallel complex having a plurality of computing units. Each computing unit includes one or more processors, and each processor may be a sender of messages, a receiver of messages, or both. One embodiment of a sender and a receiver of messages is described with reference to FIG. 1a.

Figure 1A:
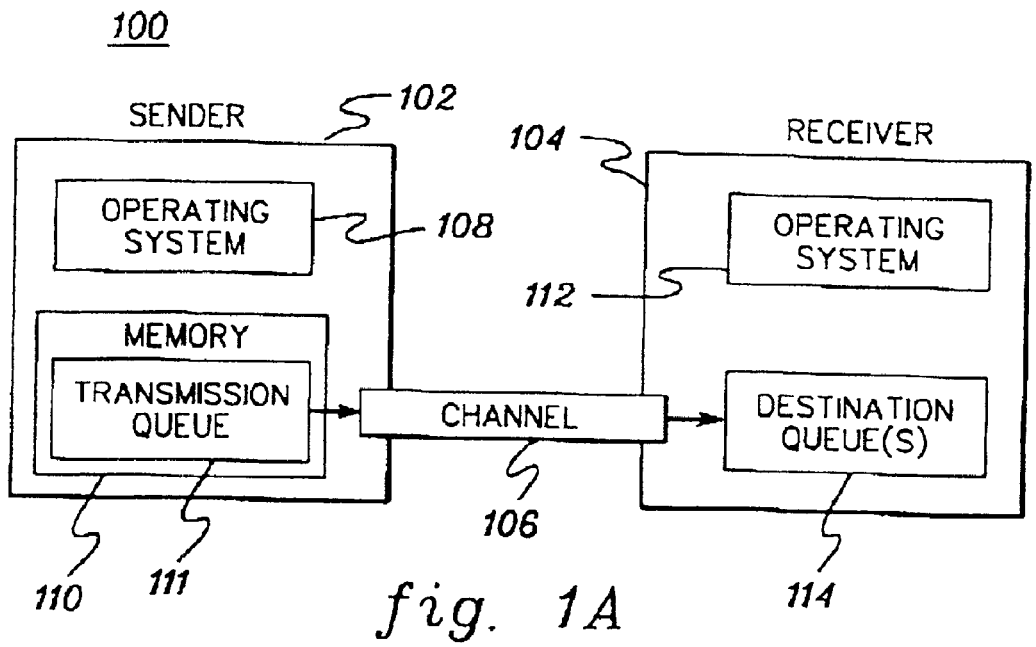
FIG. 1a depicts one embodiment of a communications environment incorporating and using one or more aspects of the present invention.

As shown in FIG. 1a, in a communications environment 100, a sender 102 is coupled to a receiver 104 via one or more channels 106. In one example, sender 102 includes an operating system 108, such as the TPF Operating System offered by International Business Machines Corporation, Armonk, N.Y., and a local memory 110. The local memory includes one or more queues 111 used for messaging. In one example, the one or more queues are transmission queues, which include messages to be transmitted to receiver 104.

Receiver 104 includes, for instance, an operating system 112, such as the TPF Operating System, and one or more destination queues 114 for receiving messages transmitted from sender 102.

Channel 106, which is used in transmitting messages from the sender to the receiver, is referred to as a sender channel, and is based, for instance, on MQSeries, offered by International Business Machines Corporation, Armonk, N.Y. MQSeries is described in a publication entitled, *MQSeries Intercommunication*, IBM Publication No. SC33-1872-03 (March 2000), which is hereby incorporated herein by reference in its entirety.

Figure 1B:
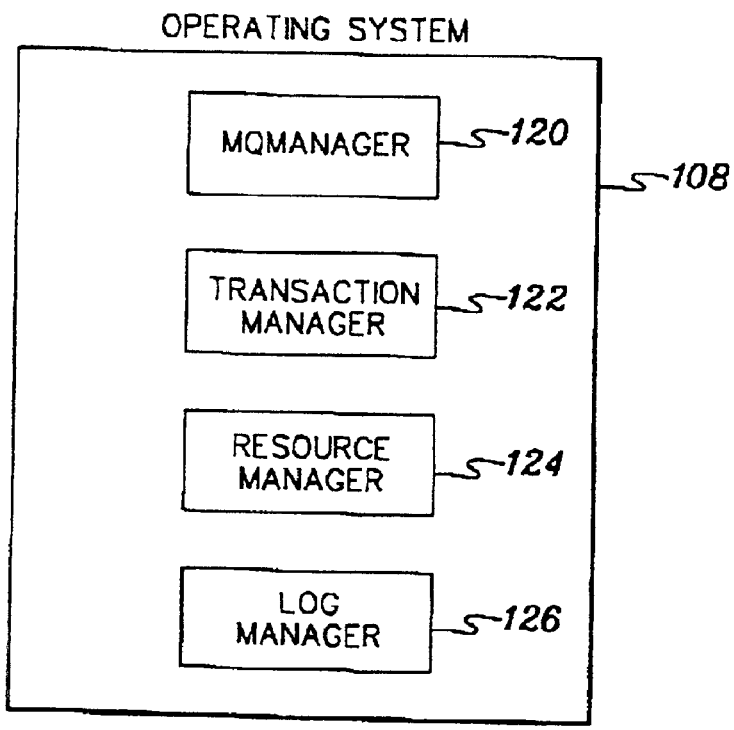
FIG. 1b depicts one example of various components of an operating system of FIG. 1a, in accordance with an aspect of the present invention.

Further details regarding operating system 108 are described with reference to FIG. 1b. Operating system 108 includes various components used to control aspects of messaging. In one example, these components include an MQManager 120 used in managing the placing of messages on a queue and the retrieving of messages from a queue; a transaction manager (TM) 122 used in controlling the initiation of commit and/or rollback operations; a resource manager 124 used in controlling the locking of a queue during commit processing; and a log manager 126 used in managing the logging of events and the processing of a recovery log, in accordance with an aspect of the present invention.

The operating system components work together to manage events associated with various queues of the communications environment, such as the memory resident queues used for transmitting MQSeries messages. One example of such a memory resident queue is described with reference to FIG. 2.

Figure 2:
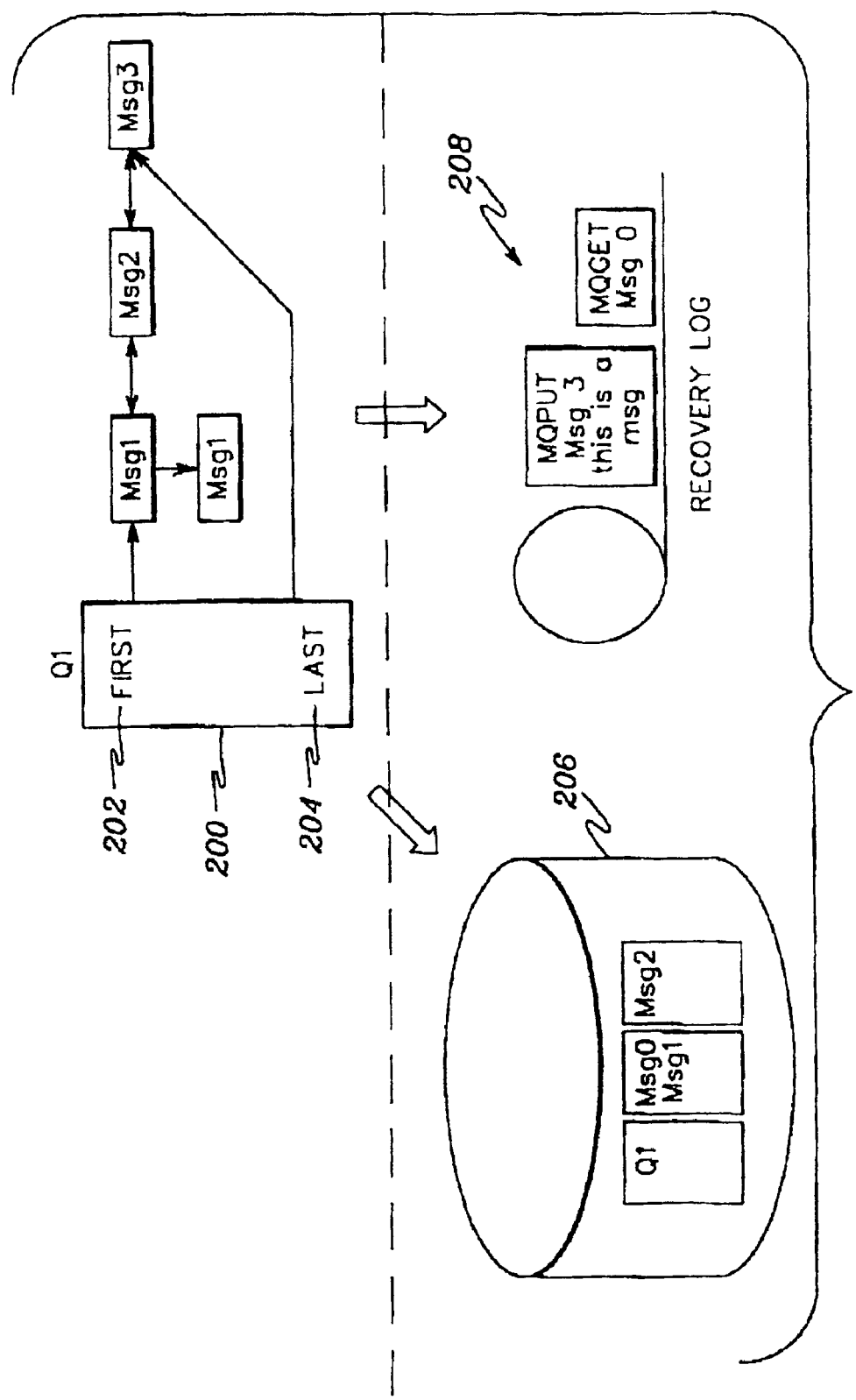
FIG. 2 depicts one embodiment of a local queue and associated checkpoint and recovery log, in accordance with an aspect of the present invention.

Referring to FIG. 2, a queue 200 includes one or more messages, assuming that it is not empty. In particular, the queue includes a first pointer 202 to a first message in a chain of one or more messages of the queue, and a last pointer 204 to a last message of the chain. The content of each message is included in one or more system work blocks (SWBs), each of which is, for instance, 1024 bytes in length.

The definition of the queue and the contents of the queue are written to a checkpoint 206 at predefined time intervals. Additionally, between checkpoints, updates are written to a recovery log 208. The use of the time-initiated checkpointing and the recovery log provides persistence of the data (e.g., messages) on the queue.

One embodiment for writing to checkpoint 206 and recovery log 208 is described in a U.S. Patent Application entitled "High-performance Memory Queue", Chen et al., Ser. No. 09/790,853, filed Feb. 22, 2001, which is hereby incorporated herein by reference in its entirety.

In accordance with an aspect of the present invention, if a memory resident queue (e.g., Q1 depicted in FIG. 3) is on an inactive processor 300 (e.g., Processor A) and is thus, inaccessible, then another processor 302 (e.g., Processor B) may take over the queue for the inactive processor. In one embodiment, the take over process is part of a reconstruction technique employed to rebuild and switch ownership of one or more memory resident queues of the inactive processor.

Figure 3:
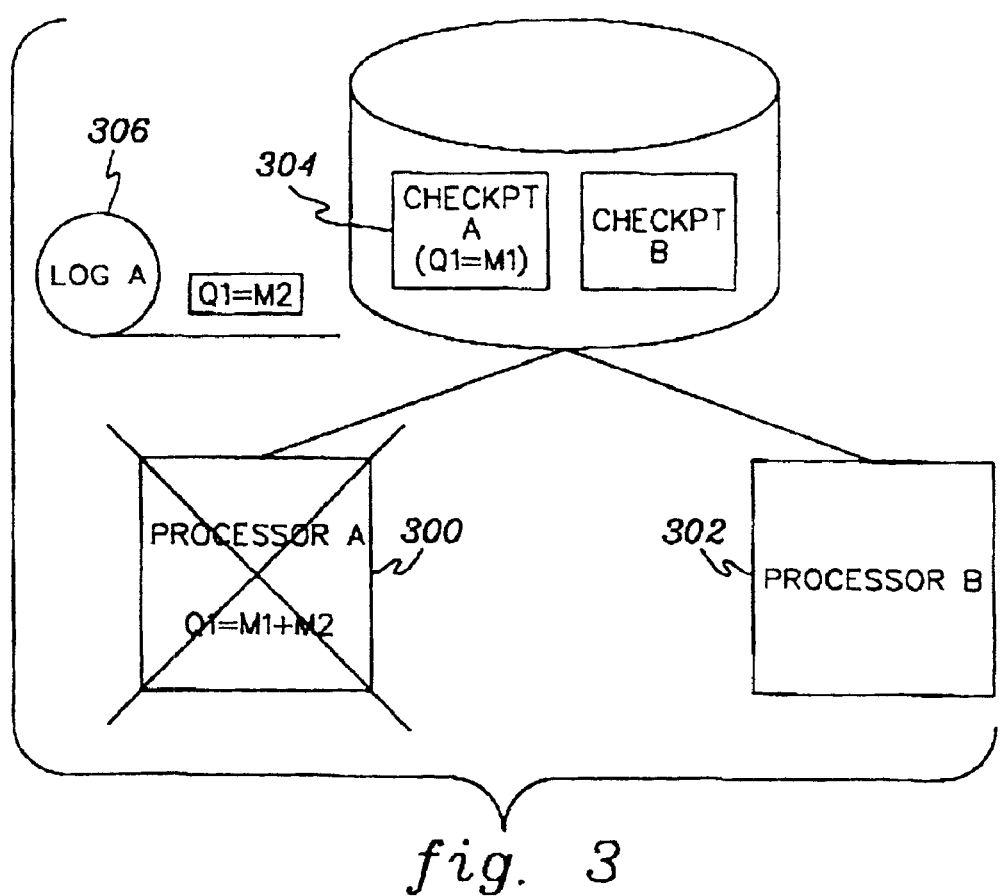
FIG. 3 is a pictorial illustration of an inactive processor, which has a queue with two messages, one in its checkpoint and one in its recovery log.

As shown in FIG. 3, the inaccessible queue, Q1, has two messages (M1 and M2) associated therewith. A copy of M1 is located on a checkpoint record 304 for Processor A, and a copy of M2 is located on a recovery log 306 for Processor A. Since the checkpoint for Q1 only has a record of one of the two messages on the queue, and likewise, since the recovery log only shows the other message, then in order to reconstruct Q1, information is needed from both the checkpoint and the log.

Figure 4:
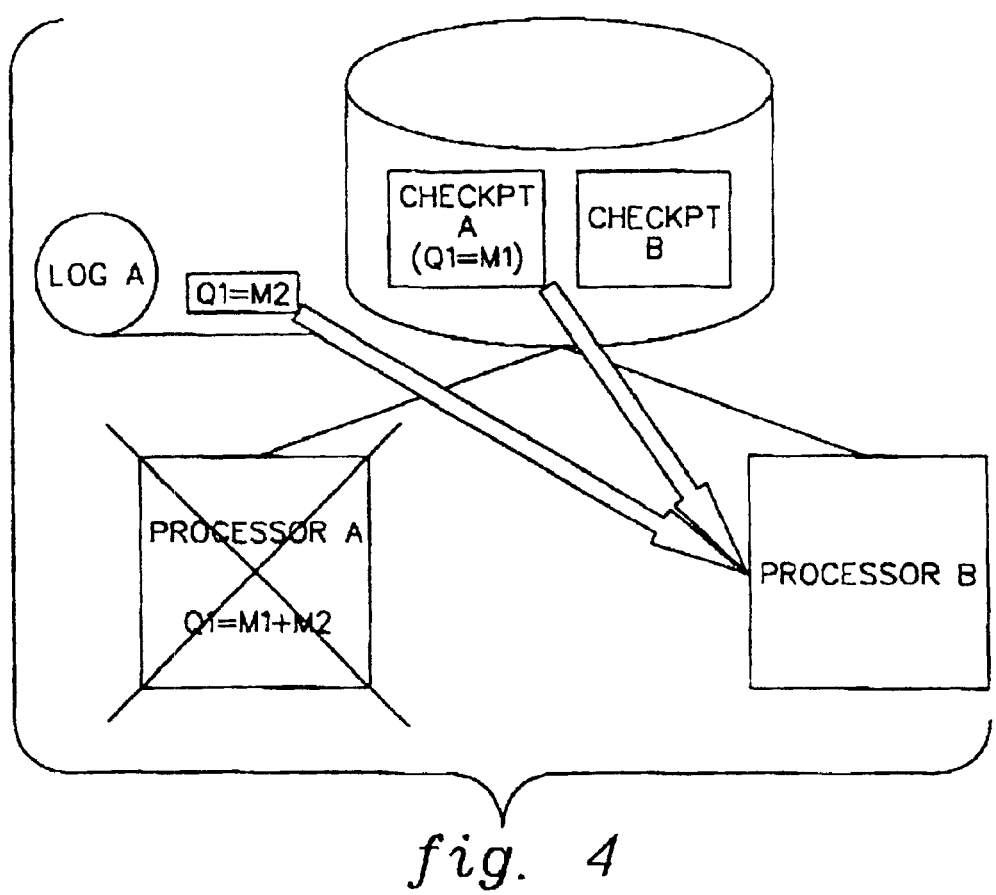
FIG. 4 is a pictorial illustration of an active processor rebuilding the queue of the inactive processor of FIG. 3, in accordance with an aspect of the present invention.

Thus, as shown in FIG. 4, in order for Processor B to rebuild Q1 of Processor A, Processor B reads in Processor A's recovery log, as well as Processor A's checkpoint, which are both stored, for instance, on shared DASD. Processor B then uses this information to rebuild Q1.

Figure 5:
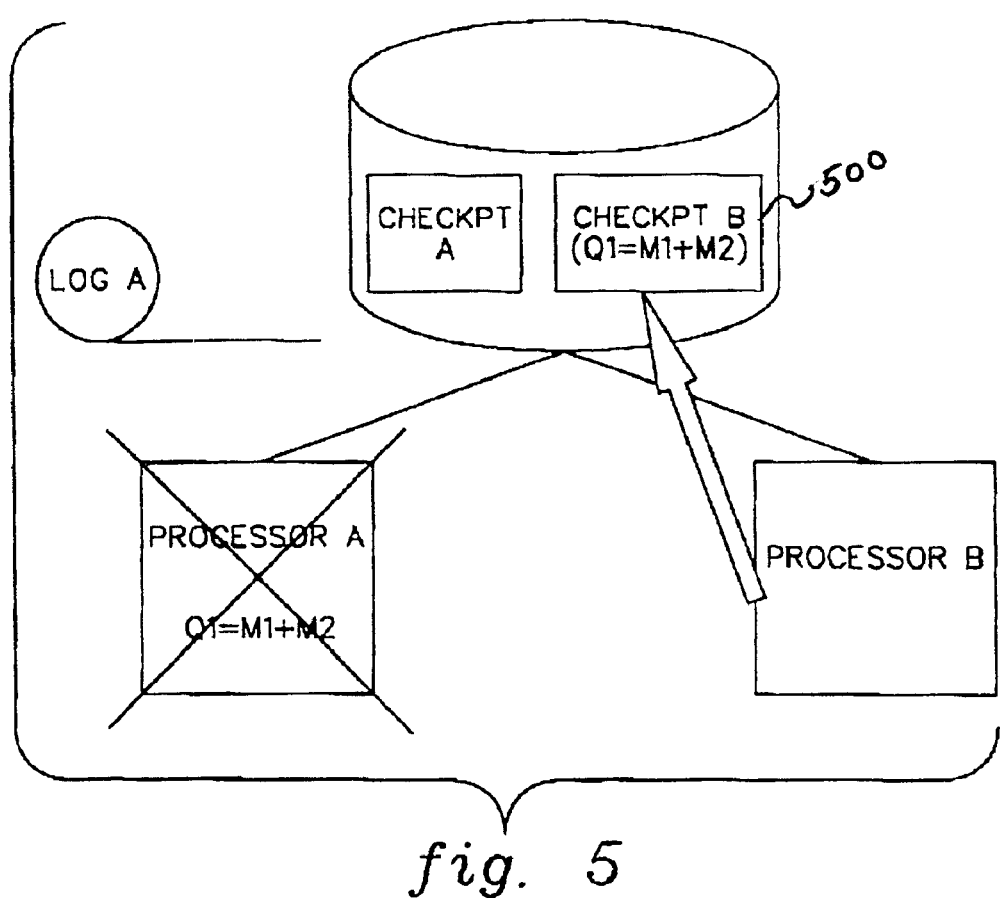
FIG. 5 is a pictorial illustration of the active processor replacing the checkpointed version of the queue with a complete rebuilt version of the queue, in accordance with an aspect of the present invention.

Subsequent to rebuilding Q1, Processor B replaces the checkpointed version of Q1 with a complete rebuilt version of the queue, as shown in FIG. 5. This rebuilt version is located in Processor B's checkpoint 500 and accurately reflects the queue state and contents before Processor A became inactive.

One embodiment of the logic associated with reconstructing a queue is described with reference to FIGS. 6–9. In particular, FIG. 6 is a general overview of the logic used to perform the reconstruction, and FIGS. 7a–9 provide further details of various steps of FIG. 6.

The reconstruction logic is performed by one or more processors, such as one or more active processors, that obtain an indication that one or more queues are to be reconstructed (or a step of the reconstruction is to be performed). The indication may be obtained from a command received by a processor, self-determination of a processor, or by any other mechanism. In this embodiment, not all of the steps of the reconstruction need to be performed by the same processor. For instance, a rebuild step can be performed by one processor and a switch step by another. These steps are further described below.

Figure 6:
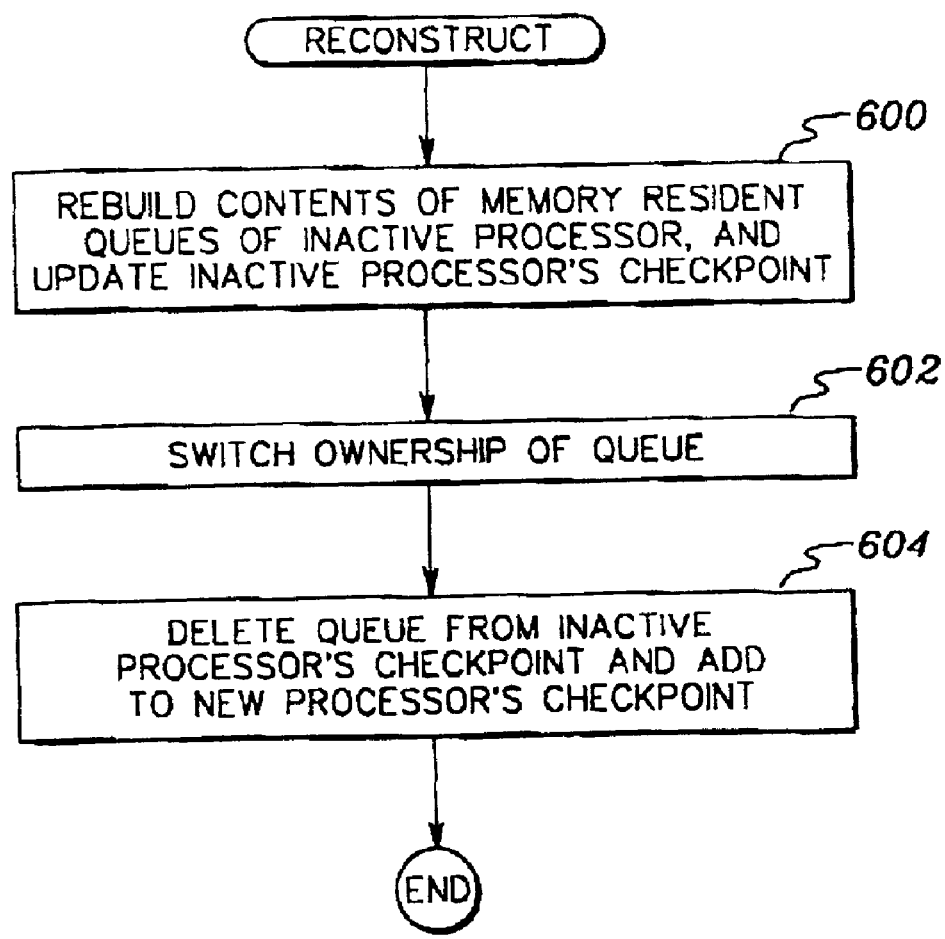
FIG. 6 depicts one embodiment of a general overview of the logic associated with reconstructing a queue, in accordance with an aspect of the present invention.

Referring to FIG. 6, one step of the reconstruction technique includes rebuilding one or more queues of a processor, such as an inactive processor, STEP 600. For example, the contents of each memory resident queue of the inactive processor to be reconstructed are rebuilt, and the inactive processor's checkpoint is updated with the most recent information. This ensures that the queues appear as they did before the processor became inactive. Then, queue ownership is switched from the inactive processor to an active processor in the communications environment, STEP 602. This includes reading the queue into the active processor's memory. Thereafter, the queue is deleted from the inactive processor's checkpoint, and added to the new owning processor's checkpoint, STEP 604. Each of these steps is described in further detail below.

Figure 7A:
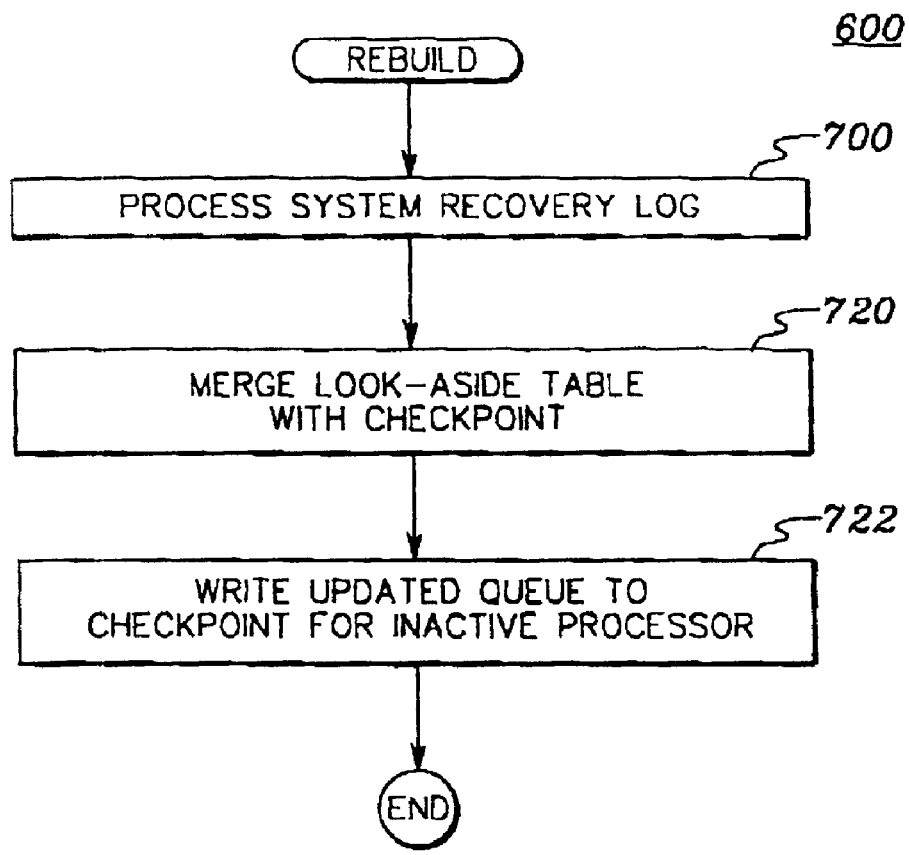
FIGS. 7a–7b depict one embodiment of further details of the logic associated with rebuilding the queue of FIG. 6, in accordance with an aspect of the present invention.
Figure 7B:
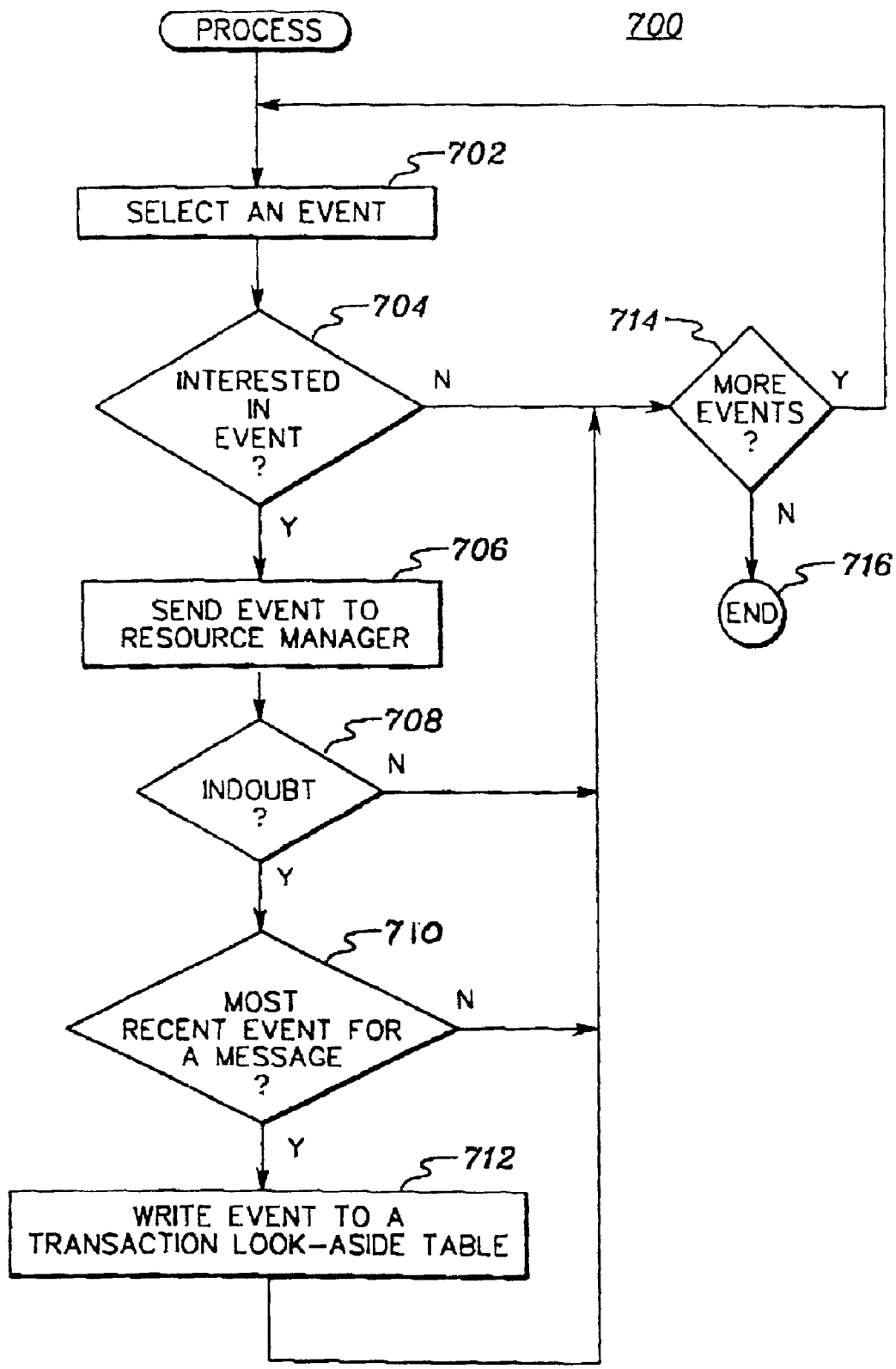
Figure 8A:
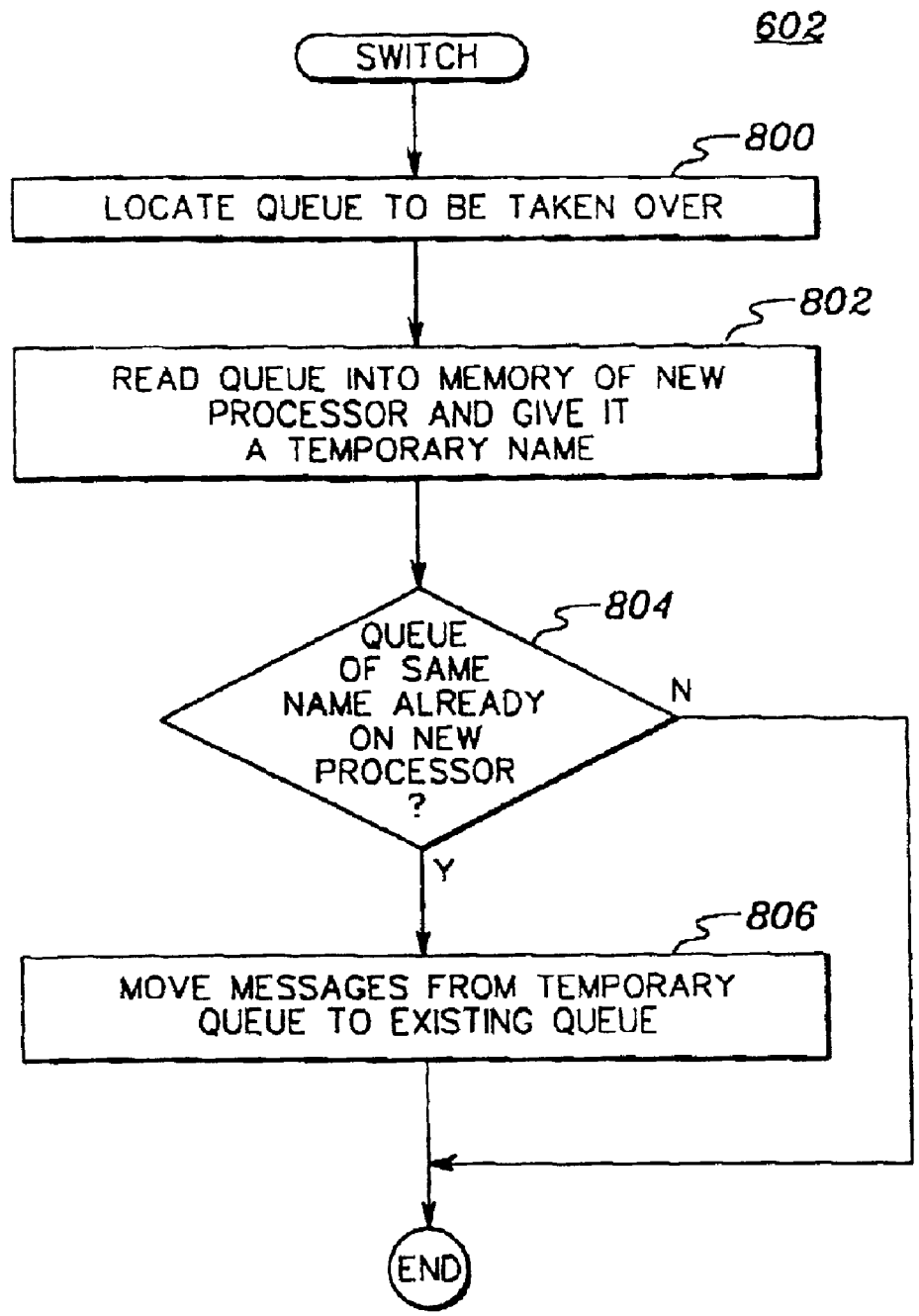
FIGS. 8a–8b depict one embodiment of further details of the logic associated with switching ownership of the queue of FIG. 6, in accordance with an aspect of the present invention.
Figure 8B:
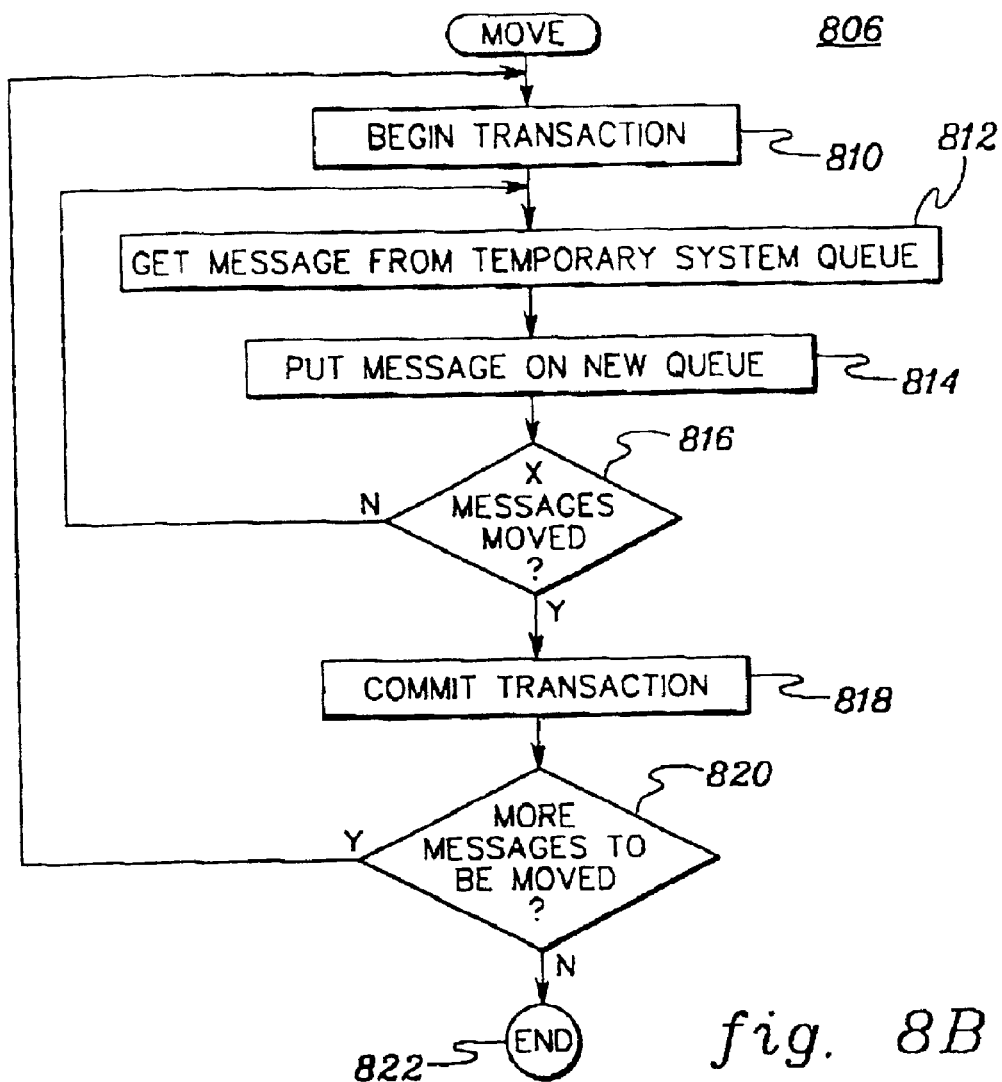
Figure 9:
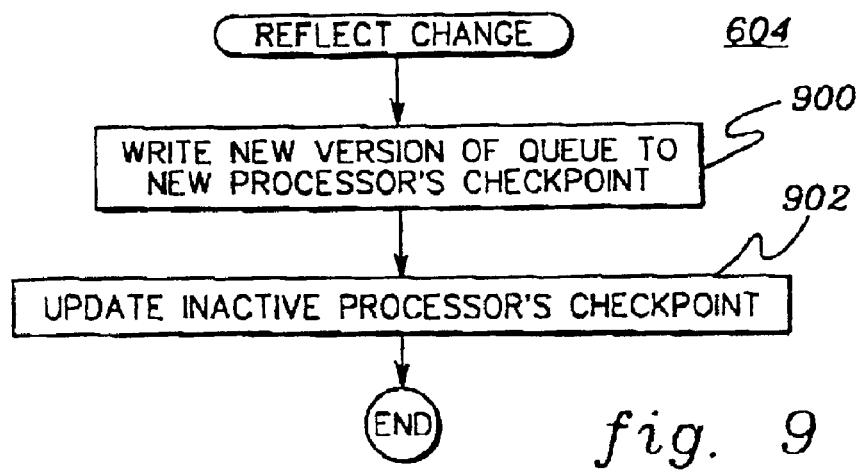
FIG. 9 depicts one embodiment of further details of the logic associated with reflecting the ownership change of the queue of FIG. 6, in accordance with an aspect of the present invention.

One embodiment of the logic associated with rebuilding the contents of a memory resident queue is described with reference to FIGS. 7a–7b. Referring to FIG. 7a, initially, the system recovery log is processed to retrieve from the log any data that is needed or desired for rebuilding the queue, STEP 700. In one example, log manager 126 processes the system recovery log in the reverse order that events were written to the log during normal operation. Thus, the recovery process is presented with recovery data in the order of the most recent event first and the oldest event last.

In one example, the log manager is only interested in the data that is associated with the queue being rebuilt. Thus, the log manager processes the recovery log by selecting an event off of the log, STEP 702 (FIG. 7b), and then, determining whether it is an event that is of interest to the log manager, INQUIRY 704. For example, if it is an MQSeries queue being rebuilt, then the log manager determines whether the event is an MQSeries event.

In one example, the various MQSeries events that are considered recoverable include: a Checkpoint process begin message and a Checkpoint process complete message; a Put message and a Get message; a sweep and unsweep of a queue; a sender channel batch list of messages; a sender channel batch commit; a sender channel batch rollback; and a receiver channel synch record. Further details regarding these events are included in the following applications, each of which is hereby incorporated herein by reference in its entirety:

U.S. Patent Application entitled "Performance Of Channels Used In Communicating Between Senders And Receivers", Chen et al., Ser. No. 09/790,781, filed on Feb. 22, 2001;

U.S. Patent Application entitled "High Performance Memory Queue", Chen et al., Ser. No. 09/790,853, filed on Feb. 22, 2001; and U.S. Patent Application entitled "Managing Memory Resident Queues To Control Resources Of The Systems Using The Queues", Chen et al., Ser. No. 09/938,031, filed Aug. 23, 2001.

Should the log manager determine that it is not an event of interest, then a further determination is made as to whether there are more events, INQUIRY 714. If so, then processing continues at STEP 702. If there are no more events, then processing is concluded.

However, if the log manager determines that it is an event of interest, then the log manager sends the event to an appropriate resource manager (e.g., an MQSeries Resource Manager), STEP 706. The resource manager has the responsibility of determining whether the event is in-doubt, INQUIRY 708. An event is in-doubt, if it is uncertain whether the event is reflected in the checkpoint. As one example, an event is not considered in-doubt, if a message is both added to and removed from a queue in the same checkpoint scope. In other words, if a message is put to a queue and gotten from the queue before the most recent checkpoint process started, then there is no message in the checkpoint, so the message is not considered in-doubt. Similarly, if a message is put to a queue and gotten from the queue after the most recent checkpoint process is completed, then the message is not considered in-doubt.

Should an event be considered in-doubt, then a further determination is made as to whether the event is the most recent event performed on a particular message, INQUIRY 710. That is, in this embodiment, the recovery process saves only the most recent event performed on a particular message. For example, if a message is put to a queue, and then, retrieved from the queue, the recovery process only saves the fact that the message was removed from the queue. (In other embodiments, other events may also be saved.) If it is the most recent event, then the event is written, by the resource manager, to a transaction look-aside table, STEP 712.

The transaction look-aside table is a table in local memory used to save in-doubt events. In one example, the table is organized by queue name and includes the minimum amount of data needed to recover a message. The table only stores in-doubt events, in this embodiment, in order to conserve memory resources. However, in another embodiment, it could be used to store other events, as well.

Subsequent to writing the event to the transaction look-aside table, a determination is made as to whether there are more events on the system recovery log to be processed, INQUIRY 714. This determination is made by, for instance, having the log manager determine whether there are any further records on the log or whether the records of a defined interval have been processed. If there are more events, then processing continues with STEP 702 "SELECT AN EVENT".

Similarly, if the No path is taken from INQUIRY 708 or INQUIRY 710, then processing continues with INQUIRY 714. Again, if there are more events, then processing continues with STEP 702. Otherwise, processing of the system recovery log is complete, STEP 716.

Returning to FIG. 7a, subsequent to saving the in-doubt transaction events in the transaction look-aside table, the queue is rebuilt to the status it had before the owning processor became inactive. This includes merging, in memory of the active processor, the look-aside table with the checkpoint for that queue, STEP 720. For increased performance, this step is performed only if the queue had data saved from the system recovery log. (However, in other embodiments, it can be performed regardless of whether data was saved.)

In order to perform the merge, one or more actions are taken depending on the type of event. Examples of those actions for each of the following transaction events, which may have been saved from the system recovery log, are outlined below:

MQPUT of a message: If the message is not already in the checkpoint version of the queue, add it to the queue;

else, make sure the message is marked in the checkpoint as available and committed.

MQGET of a message: If the message is in the checkpoint version of the queue, remove it; else, do nothing.

Sweep of a queue: For each message in the list of messages swept from memory, if the message is in the checkpoint version of the queue, remove it; else, do nothing.

Unsweep of a message: If the message is not already in the checkpoint version of the queue, add it to the queue; else, make sure the message is marked in the checkpoint as available and committed.

Sender Channel Batchlist of messages: For each message in the list of messages contained in a particular batch (based on logical unit of work ID [LUWID] of the batch), mark each message with the indicated batch LUWID.

Sender Channel Batch Commit: If the batch has been successfully sent, remove all messages in the queue that contain the batch LUWID.

Sender Channel Batch Rollback: If the batch was not successfully sent, for each message in the queue that has a matching LUWID, clear the LUWID.

Receiver Channel Synch Record: Save the most recent synch record for a given receiver channel.

Subsequent to merging the look-aside table with the checkpoint, the updated queue is written to the checkpoint for the inactive processor, STEP 722. This concludes the processing associated with rebuilding the contents of the memory resident queue.

Referring once again to FIG. 6, after rebuilding the contents of the memory resident queue, ownership of the queue may be switched to a processor desirous of taking over the queue for the inactive processor, STEP 602. As examples, the processor may be instructed to take over the queue by an operator command or may programmatically determine that it is to take over the queue (e.g., decides to access the queue). The processor to take over the queue may be the same or different from the processor that rebuilt the queue. One embodiment of the logic associated with this ownership switch is described with reference to FIGS. 8a–8b.

Initially, the checkpoint of the inactive processor is interrogated to locate the queue whose ownership is being taken over by the active processor, STEP 800. The queue is then read into memory of the new owning processor and given a temporary system name, STEP 802. Thereafter, a determination is made as to whether a queue with the same name (i.e., same actual name) already exists on the new owning processor, INQUIRY 804. If not, then the queue is renamed back to its actual name and processing of the switch is complete.

However, if a queue with the same name already exists, then the messages are moved from the temporary system queue to this already existing queue, STEP 806. In order to move the messages from the temporary queue to the existing queue, commit scopes are used such that messages are not lost or duplicated in the event that an unplanned outage occurs in the middle of the queue take over process. One embodiment of the logic associated with moving messages from the temporary queue to the existing queue is described with reference to FIG. 8b.

Initially, a transaction is begun, STEP 810. Then, a message is retrieved from the temporary system queue, STEP 812, and put on the new queue, STEP 814. Thereafter, a determination is made as to whether a defined number of messages (e.g., X, where X is selected as a comfortable number of messages in one transaction) has been moved, INQUIRY 816. If the defined number of messages has not been moved, then processing continues with STEP 812. Otherwise, the transaction is committed, STEP 818.

Thereafter, a determination is made as to whether there are more messages on the temporary system queue to be moved to the existing queue, INQUIRY 820. If there are more messages to be moved, then processing continues at STEP 810. Otherwise, processing of the move, and thus, the ownership switch, is complete, STEP 822.

Referring once again to FIG. 6, subsequent to switching ownership of the queue, the queue is deleted from the inactive processor's checkpoint and added to the new processor's checkpoint, STEP 604. One embodiment of the logic associated with reflecting this change is described with reference to FIG. 9. Initially, the new version of the queue is written from memory of the new owning processor to the new processor's checkpoint stored, for instance, on DASD, STEP 900. Then, the inactive processor's checkpoint is updated, which includes, for instance, deleting the queue from that checkpoint, STEP 902. This concludes one embodiment of a technique for reconstructing a queue.

In one example, the above procedure is used for each queue to be reconstructed. It may be that all the steps are performed for each queue prior to moving on to the next queue, or that one or more steps may be performed on a plurality of queues before proceeding to the next step. For instance, a plurality of the queues of an inactive processor to be reconstructed may be rebuilt before proceeding to the take over step. Other variations are also possible.

Although the examples described above describe reconstructing MQSeries queues, such as MQSeries memory resident transmission queues, aspects of the invention can also be used for other memory resident queues, including for queues other than MQSeries queues. Aspects of the invention are applicable for systems other than those using MQSeries.

Further, although aspects of the invention are described with reference to queues of an inactive processor, aspects of the invention are equally applicable to queues that are inaccessible for other reasons and/or for queues that are to be moved from one processor to another regardless of the reason.

The communications environment described above is only one example. For instance, although the operating system is described as TPF, this is only one example. Various other operating systems can be used. Further, the operating systems in the different computing environments can be heterogeneous. The invention works with different platforms. Additionally, the invention is usable by other types of environments.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of switching queue ownership, said method comprising:

obtaining an indication that a queue is to be taken over, said queue being resident in memory of a first processor; and moving said queue from said first processor to a second processor, said queue to be resident in memory of said second processor and not resident in memory of said first processor.

2. The method of claim 1, wherein said first processor is inactive.

3. The method of claim 1, further comprising rebuilding said queue prior to moving said queue.

4. The method of claim 3, wherein said rebuilding comprises using a recovery log and a checkpoint of said queue to rebuild contents of said queue, said recovery log and said checkpoint being associated with said first processor.

5. The method of claim 3, wherein said rebuilding comprises:

processing at least a portion of a recovery log of said first processor to obtain one or more in-doubt events for the queue; and merging at least one in-doubt event of the one or more in-doubt events with a checkpoint of the queue to obtain a rebuilt version of the queue, said checkpoint being associated with said first processor.

6. The method of claim 5, further comprising writing the rebuilt version of the queue to the checkpoint of the queue.

7. The method of claim 5, wherein said processing comprises processing said at least a portion of the recovery log in reverse order.

8. The method of claim 5, wherein each in-doubt event of the one or more in-doubt events represents a most recent event for a message of the queue.

9. The method of claim 1, wherein said moving comprises reading the queue into memory of said second processor.

10. The method of claim 9, wherein said queue has a defined name, and wherein said reading comprises:

assigning a temporary name to the queue;

determining whether a queue having the defined name already exists on the second processor; and moving, in response to the determining, contents of said queue having the assigned temporary name to the existent queue.

11. The method of claim 10, wherein said moving contents to the existent queue comprises moving the contents within one or more commit scopes.

12. The method of claim 10, further comprising:

writing a version of the queue to a checkpoint of the second processor; and deleting a version of the queue from a checkpoint of the first processor.

13. The method of claim 1, further comprising:

writing a version of the queue to a checkpoint of the second processor; and deleting a version of the queue from a checkpoint of the first processor.

14. The method of claim 1, wherein the moving is performed in response to an indication that the queue is to be taken over and not in response to performing a transaction in which the queue is processed.

15. A method of reconstructing queues, said method comprising:

rebuilding contents of a queue to obtain an updated version of the queue, said queue being a memory resident queue of a first processor; and reading at least a portion of the updated version of the queue into memory of a second processor, said second processor being different than said first processor, and wherein said at least a portion of the updated version of the queue no longer resides in local memory of the first processor.

16. The method of claim 15, further comprising writing a version of the queue stored in memory of said second processor to a checkpoint of the second processor.

17. The method of claim 16, further comprising deleting a version of the queue from a checkpoint of the first processor.

18. The method of claim 17, wherein the version of the queue being deleted is an updated version written to the checkpoint of the first processor, in response to the rebuilding.

19. The method of claim 15, wherein said rebuilding comprises:

processing at least a portion of a recovery log of said first processor to obtain one or more in-doubt events for the queue; and merging at least one in-doubt event of the one or more in-doubt events with a checkpoint of the queue to obtain the updated version of the queue, said checkpoint being associated with said first processor.

20. The method of claim 19, wherein said processing comprises processing said at least a portion of the recovery log in reverse order.

21. The method of claim 15, wherein said rebuilding comprises using a recovery log and a checkpoint of said queue to rebuild contents of said queue, said recovery log and said checkpoint being associated with said first processor.

22. A system of switching queue ownership, said system comprising:

means for obtaining an indication that a queue is to be taken over, said queue being resident in memory of a first processor; and means for moving said queue from said first processor to a second processor, said queue to be resident in memory of said second processor and not resident in memory of said first processor.

23. The system of claim 22, wherein said first processor is inactive.

24. The system of claim 22, further comprising means for rebuilding said queue prior to moving said queue.

25. The system of claim 24, wherein said means for rebuilding comprises means for using a recovery log and a checkpoint of said queue to rebuild contents of said queue, said recovery log and said checkpoint being associated with said first processor.

26. The system of claim 24, wherein said rebuilding comprises:

means for processing at least a portion of a recovery log of said first processor to obtain one or more in-doubt events for the queue; and means for merging at least one in-doubt event of the one or more in-doubt events with a checkpoint of the queue to obtain a rebuilt version of the queue, said checkpoint being associated with said first processor.

27. The system of claim 26, further comprising means for writing the rebuilt version of the queue to the checkpoint of the queue.

28. The system of claim 26, wherein said means for processing comprises means for processing said at least a portion of the recovery log in reverse order.

29. The system of claim 26, wherein each in-doubt event of the one or more in-doubt events represents a most recent event for a message of the queue.

30. The system of claim 22, wherein said means for moving comprises means for reading the queue into memory of said second processor.

31. The system of claim 30, wherein said queue has a defined name, and wherein said means for reading comprises:

means for assigning a temporary name to the queue;

means for determining whether a queue having the defined name already exists on the second processor; and means for moving, in response to the determining, contents of said queue having the assigned temporary name to the existent queue.

32. The system of claim 31, wherein said means for moving contents to the existent queue comprises means for moving the contents within one or more commit scopes.

33. The system of claim 31, further comprising:

means for writing a version of the queue to a checkpoint of the second processor; and means for deleting a version of the queue from a checkpoint of the first processor.

34. The system of claim 22, further comprising:

means for writing a version of the queue to a checkpoint of the second processor; and means for deleting a version of the queue from a checkpoint of the first processor.

35. A system of reconstructing queues, said system comprising:

means for rebuilding contents of a queue to obtain an updated version of the queue, said queue being a memory resident queue of a first processor; and means for reading at least a portion of the updated version of the queue into memory of a second processor, said second processor being different than said first processor, and wherein said at least a portion of the updated version of the queue no longer resides in local memory of the first processor.

36. The system of claim 35, further comprising means for writing a version of the queue stored in memory of said second processor to a checkpoint of the second processor.

37. The system of claim 36, further comprising means for deleting a version of the queue from a checkpoint of the first processor.

38. The system of claim 37, wherein the version of the queue being deleted is an updated version written to the checkpoint of the first processor, in response to the rebuilding.

39. The system of claim 35, wherein said means for rebuilding comprises:

means for processing at least a portion of a recovery log of said first processor to obtain one or more in-doubt events for the queue; and means for merging at least one in-doubt event of the one or more in-doubt events with a checkpoint of the queue to obtain the updated version of the queue, said checkpoint being associated with said first processor.

40. The system of claim 39, wherein said means for processing comprises means for processing said at least a portion of the recovery log in reverse order.

41. The system of claim 35, wherein said means for rebuilding comprises means for using a recovery log and a checkpoint of said queue to rebuild contents of said queue, said recovery log and said checkpoint being associated with said first processor.

42. A system of switching queue ownership, said system comprising:

a queue resident in memory of a first processor; and at least a second processor adapted to move said queue from said first processor to the second processor, said queue to be resident in memory of said second processor and not resident in memory of said first processor.

43. A system of reconstructing queues, said system comprising:

a first processor adapted to rebuild contents of a queue to obtain an updated version of the queue, said queue being a memory resident queue of a second processor; and a third processor adapted to read at least a portion of the updated version of the queue into memory of the third processor, said third processor being different than said second processor, and wherein said at least a portion of the updated version of the queue no longer resides in local memory of the second processor.

44. The system of claim 43, wherein said first processor and said third processor are the same.

45. The system of claim 43, wherein said first processor and said third processor are different processors.

46. At least one program storage device readable by a computing unit, tangibly embodying at least one program of instructions executable by the computing unit to perform a method of switching queue ownership, said method comprising:

obtaining an indication that a queue is to be taken over, said queue being resident in memory of a first processor; and moving said queue from said first processor to a second processor, said queue to be resident in memory of said second processor and not resident in memory of said first processor.

47. The at least one program storage device of claim 46, wherein said first processor is inactive.

48. The at least one program storage device of claim 46, wherein said method further comprises rebuilding said queue prior to moving said queue.

49. The at least one program storage device of claim 48, wherein said rebuilding comprises using a recovery log and a checkpoint of said queue to rebuild contents of said queue, said recovery log and said checkpoint being associated with said first processor.

50. The at least one program storage device of claim 48, wherein said rebuilding comprises:

processing at least a portion of a recovery log of said first processor to obtain one or more in-doubt events for the queue; and merging at least one in-doubt event of the one or more in-doubt events with a checkpoint of the queue to obtain a rebuilt version of the queue, said checkpoint being associated with said first processor.

51. The at least one program storage device of claim 50, wherein said method further comprises writing the rebuilt version of the queue to the checkpoint of the queue.

52. The at least one program storage device of claim 50, wherein said processing comprises processing said at least a portion of the recovery log in reverse order.

53. The at least one program storage device of claim 50, wherein each in-doubt event of the one or more in-doubt events represents a most recent event for a message of the queue.

54. The at least one program storage device of claim 46, wherein said moving comprises reading the queue into memory of said second processor.

55. The at least one program storage device of claim 54, wherein said queue has a defined name, and wherein said reading comprises:
   assigning a temporary name to the queue;
   determining whether a queue having the defined name already exists on the second processor; and
   moving, in response to the determining, contents of said queue having the assigned temporary name to the existent queue.

56. The at least one program storage device of claim 55, wherein said moving contents to the existent queue comprises moving the contents within one or more commit scopes.

57. The at least one program storage device of claim 55, wherein said method further comprises:
   writing a version of the queue to a checkpoint of the second processor; and
   deleting a version of the queue from a checkpoint of the first processor.

58. The at least one program storage device of claim 46, wherein said method further comprises:
   writing a version of the queue to a checkpoint of the second processor; and
   deleting a version of the queue from a checkpoint of the first processor.

59. At least one program storage device readable by a computing unit, tangibly embodying at least one program of instructions executable by the computing unit to perform a method of reconstructing queues, said method comprising:
   rebuilding contents of a queue to obtain an updated version of the queue, said queue being a memory resident queue of a first processor; and
   reading at least a portion of the updated version of the queue into memory of a second processor, said second processor being different than said first processor, and wherein said at least a portion of the updated version of the queue no longer resides in local memory of the first processor.

60. The at least one program storage device of claim 59, wherein said method further comprises writing a version of the queue stored in memory of said second processor to a checkpoint of the second processor.

61. The at least one program storage device of claim 59, wherein said method further comprises deleting a version of the queue from a checkpoint of the first processor.

62. The at least one program storage device of claim 61, wherein the version of the queue being deleted is an updated version written to the checkpoint of the first processor, in response to the rebuilding.

63. The at least one program storage device of claim 59, wherein said rebuilding comprises:
   processing at least a portion of a recovery log of said first processor to obtain one or more in-doubt events for the queue; and
   merging at least one in-doubt event of the one or more in-doubt events with a checkpoint of the queue to obtain the updated version of the queue, said checkpoint being associated with said first processor.

64. The at least one program storage device of claim 63, wherein said processing comprises processing said at least a portion of the recovery log in reverse order.

65. The at least one program storage device of claim 59, wherein said rebuilding comprises using a recovery log and a checkpoint of said queue to rebuild contents of said queue, said recovery log and said checkpoint being associated with said first processor.

* * * * *

UNITED STATES PATENT AND TRADEMARK OFFICE
CERTIFICATE OF CORRECTION

PATENT NO. : 6,901,533 B2
DATED : May 31, 2005
INVENTOR(S) : Chen et al.

It is certified that error appears in the above-identified patent and that said Letters Patent is hereby corrected as shown below:

<u>Title page,</u>
Item [54], Title, delete the word "RESIDENTS" and insert -- RESIDENT --

Signed and Sealed this

Nineteenth Day of July, 2005

JON W. DUDAS
*Director of the United States Patent and Trademark Office*